United States Patent [19]

McRitchie

[11] 4,035,212

[45] July 12, 1977

[54] PROCESS OF AND COMPOSITION FOR COVERING THE ENDS OF METAL ROLLS

[75] Inventor: David G. McRitchie, Salisbury, N.C.

[73] Assignee: Carolina Rubber Hose Company, Salisbury, N.C.

[21] Appl. No.: 598,994

[22] Filed: July 25, 1975

Related U.S. Application Data

[63] Continuation-in-part of Ser. No. 491,690, July 25, 1974, abandoned.

[51] Int. Cl.² .................................... B65H 81/06
[52] U.S. Cl. ............................ 156/187; 29/123; 29/132; 156/192; 156/244; 156/194; 156/293; 156/215; 264/267; 264/269; 264/268; 264/294
[58] Field of Search .......... 156/184, 185, 187, 191, 156/192, 194, 244, 293, 215, 312, 69, 221, 188, 195; 427/388; 264/210 R, 294, 236, 347, 259, 268, 267, 269; 29/123, 132; 260/42.36, 42.37, 42.53

[56] References Cited

U.S. PATENT DOCUMENTS

| 2,333,800 | 11/1943 | Lewis et al. | 156/187 |
| 2,428,252 | 9/1947 | Von Stroh | 260/42.37 |
| 2,582,795 | 1/1952 | Prentiss et al. | 260/42.37 |
| 3,313,764 | 4/1967 | Iino | 260/42.37 |
| 3,354,243 | 11/1967 | Dodge | 264/347 |
| 3,726,736 | 4/1973 | Wolfenden | 156/195 |

Primary Examiner—William A. Powell
Assistant Examiner—J. J. Gallagher
Attorney, Agent, or Firm—Bell, Seltzer, Park & Gibson

[57] ABSTRACT

Process of and composition for forming a hard, rubber-like covering on the ends of metal rolls utilized in the textile, paper or other industry including the following. A semi-liquid, elastomeric, polymeric, coating composition is provided having a viscosity sufficient to prevent sagging from the ends of the metal roll when applied thereto while being sufficiently liquid to dispense easily in a continuous stream and being cross-linkable to form a hard, rubber-like material. Cement is applied onto the ends of the metal roll and the semi-liquid coating composition is applied onto the cemented ends. The coating composition is cross-linked by heating to cure and solidify the semi-liquid composition to form a hard rubber-like coating on the ends of the metal roll. The semi-liquid coating composition includes a cross-linkable liquid elastomeric polymer, a porosity suppressant, an accelerator, a non-reinforcing pigment filler, a reinforcing mineral pigment, and a cross-linking agent, in specifically determined ranges of parts by weight. The composition may include a viscosifier for providing thixotropic properties to the composition.

10 Claims, 7 Drawing Figures

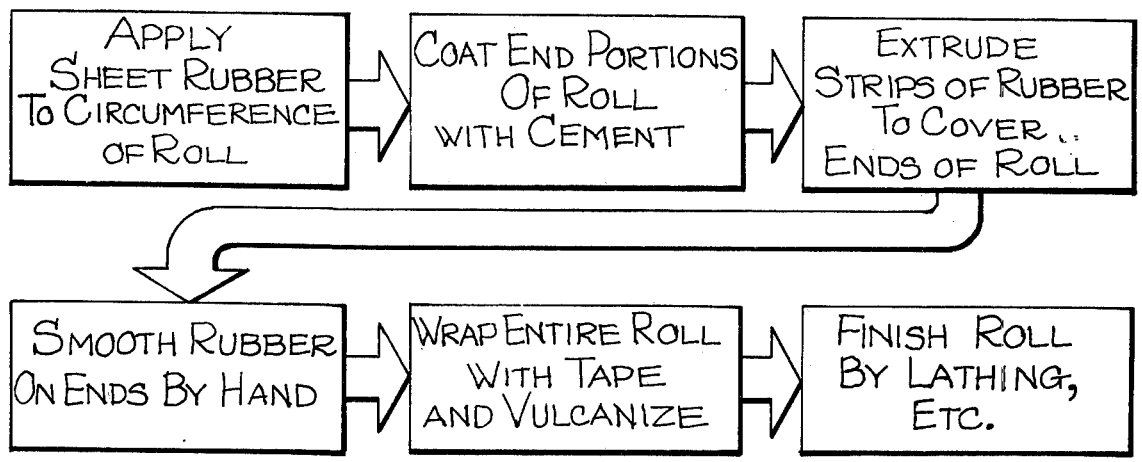
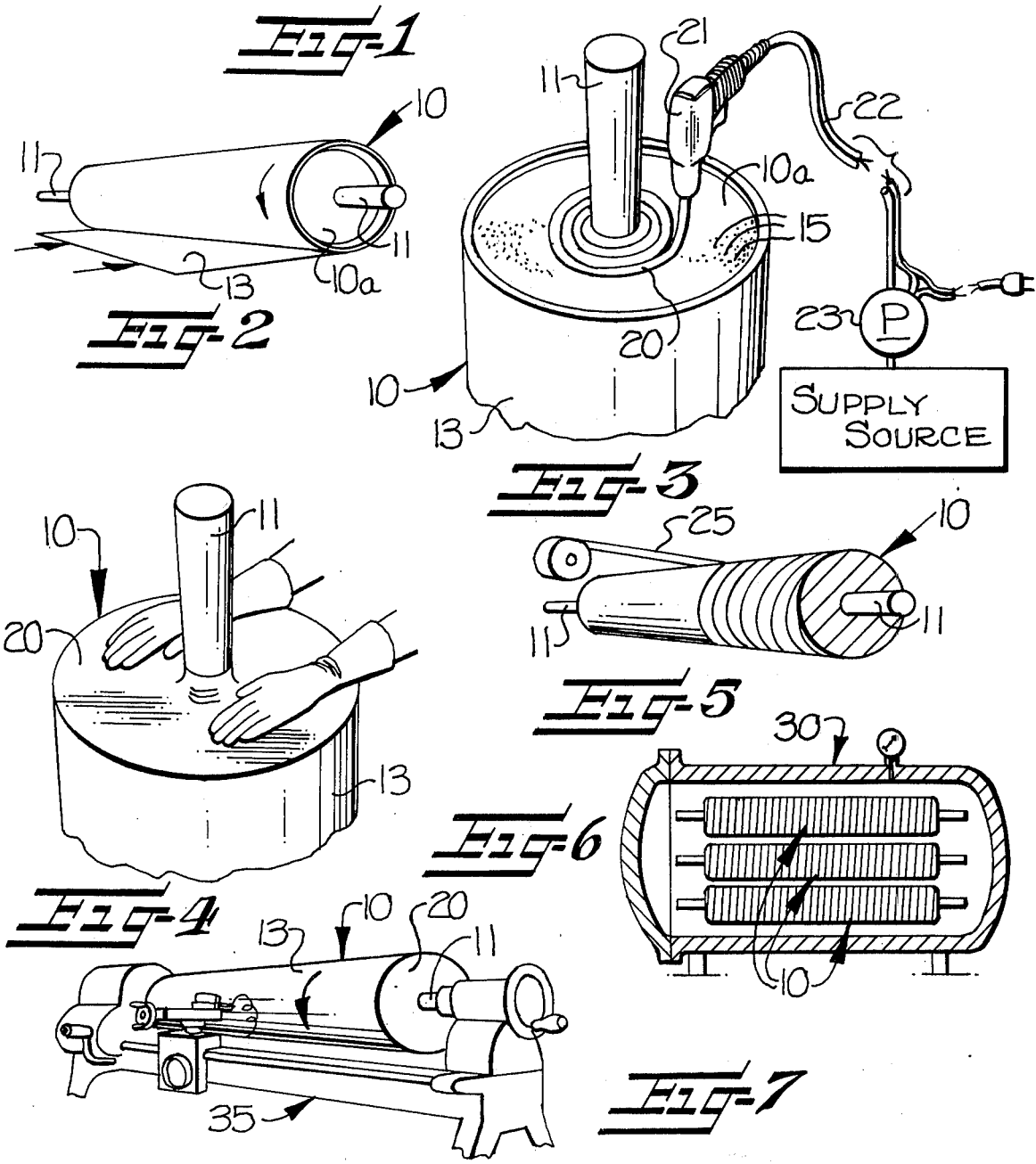

PROCESS OF AND COMPOSITION FOR COVERING THE ENDS OF METAL ROLLS

This application is a continuation-in-part of prior U.S. application No. 491,690, filed July 25, 1974 now abandoned.

This invention relates to an improved process of forming a hard, rubber-like covering on the ends of metal rolls utilized in the textile, paper or other industries, and a unique covering composition therefor and the resulting end covered roll.

BACKGROUND OF THE INVENTION

Metal rolls, as utilized in the textile, paper and other industries in manufacturing operations, wet processing or finishing operations, etc., often are required to have a flexible, chemical resistant, rubber-like coating over the entire roll including the ends thereof. The purpose of this rubber-like coating, in addition to giving more resilient surface characteristics, is to prevent corrosion of the metal rolls during such manufacturing uses.

Heretofore, such metal rolls have conventionally been covered by the use of sheet rubber material applied directly to the metal rolls after the surfaces of the metal rolls have been coated with a suitable cement. This technique presented few problems with respect to covering of the circumferential outside longitudinal surfaces of the generally cylindrical metal rolls. However, problems were presented with respect to covering of the ends of these metal rolls from which there normally extends small stub shafts for supporting of the rolls in the machinery in which they are utilized.

Covering of these ends of the metal rolls has, heretofore, normally been performed by plying up sheets of calendered sheet rubber stock, cutting these sheets of rubber stock into discs of the diameter of the ends of the metal rolls, and finally applying these cut discs of sheet rubber stock to cemented ends of the metal rolls. In order to make sure that the entire ends of the metal rolls are covered by these cut discs of sheet rubber stock, it was often necessary to make a diametrical cut in these discs of sheet rubber stock in order to attempt to apply these discs around the extending shafts from the ends of the metal rolls. This prior practice was time consuming and often resulted in uneven and inadequately covered ends on the metal rolls.

The sheet rubber stock material utilized in these prior conventional practices was normally a compound of conventional solid natural or synthetic elastomeric material or rubber, which required considerable energy for their formation into sheets or strips and the sheets or strips had to be maintained under high pressure during their vulcanization to prevent delamination. These sheet rubber stock materials normally had a molecular weight range from about 200,000 to 600,000 and required from 200 to 10,000 psi to form it before vulcanization.

Although other techniques of covering metal rolls including the ends thereof have been proposed, and other rubber or elastomeric compositions for use in covering the ends of metal rolls have been proposed, none of these have been found satisfactory for overcoming the problems set forth above and produced additional problems which resulted in unsatisfactory commercial processes and compositions for covering the ends of rolls or unsatisfactory covered rolls. Examples of such prior roll covering processes and rubber-like compositions may be found in the following patents which have been considered at the time of filing of the present application:

| U.S. Pat. No. | Inventor | Issue Date |
|---|---|---|
| 1,736,911 | Gray | November, 1929 |
| 1,943,275 | Lerch | January, 1934 |
| 2,333,800 | Lewis et al | November, 1943 |
| 2,582,795 | Prentiss et al | January, 1952 |
| 2,950,990 | Johnson | August, 1960 |
| 3,046,178 | Tupper | July, 1962 |
| 3,313,764 | Iino | April, 1967 |
| 3,331,907 | Salzinger | July, 1967 |
| 3,354,243 | Dodge | November, 1967 |
| 3,677,856 | MacCallum et al | July, 1972 |
| 3,726,736 | Wolfenden | April, 1973 |

SUMMARY OF THE INVENTION

Accordingly, it is the object of this invention to provide an improved process of and composition for forming a hard, rubber-like covering on the ends of metal rolls utilized in the textile, paper or other industry and the resulting improved end covered rolls, which eliminates and avoids problems presented with prior covering techniques and compositions and which provides improved, uniform, satisfactorily covered ends on these metal rolls.

By this invention, it has been found that the above object may be accomplished by providing a process including broadly the following steps. A semi-liquid, elastomeric, polymeric, coating composition is provided having a viscosity sufficient to prevent sagging from the ends of the metal roll when applied thereto while being sufficiently liquid to dispense easily in a continuous stream and being cross-linkable to form a hard, rubber-like material. Cement is applied onto the ends of the metal roll. The semi-liquid coating composition is applied onto the cemented ends of the metal roll and the desired area of such ends is covered. The coating composition is cross-linked by heating the thus formed coverings on the ends of the metal roll to cure and solidify the semi-liquid composition to form a hard rubber-like coating on the ends of the metal roll.

Preferably, the semi-liquid coating composition is applied onto the cemented ends of the metal roll by forming a continuous stream of the semi-liquid coating composition and applying such stream to the cemented ends of the metal roll in an increasing diameter, continuous spiral for covering the entire area of such ends.

The semi-liquid, elastomeric, polymeric, coating composition utilized in this process preferably has a molecular weight in the range of about 2,000 to 20,000 (as contrasted to the molecular weight of about 200,000 to 600,000 of the conventional rubber-like sheet materials discussed above) and a viscosity in the range of about 60mm to 110mm of penetration (ASTM D217, Cone Potentiometer Test) which provides a semi-liquid coating composition of about the consistency of a caulking compound or paste which may be easily formed into a continuous stream and applied to the ends of the rolls and which has sufficient viscosity to prevent sagging from the ends of the metal rolls after being applied thereto and prior to cross-linking to form a hard rubber-like coating on the rolls. The semi-liquid coating composition of this invention may also be easily smoothed on the ends of the metal rolls after application thereto manually by an operator with his hands as a potter would mold clay, while the above-discussed conventional sheet rubber-like stock material would require from 200 to 10,000 psi to form it before devulcanization.

By this invention, it has been determined a semi-liquid, elastomeric, polymeric, coating composition, which may be used in the above outlined process and has not heretofore been suggested or compounded for use in covering the ends of metal rolls, comprises:

|  | Parts By Weight Range |
|---|---|
| Cross-linkable liquid elastomeric polymer | 100.0 |
| Porosity suppressant | 1.5 – 3.5 |
| Accelerator | 0.1 – 5.0 |
| Non-reinforcing pigment filler | 50.0 – 90.0 |
| Reinforcing mineral pigment | 55.0 – 75.0 |
| Cross-linking agent | 2.0 – 35.0 |
| Viscosifier | 0 – 10.0 |

Further specific details of the preferred process and composition of this invention will be set forth below in the more detailed description to follow.

BRIEF DESCRIPTION OF THE DRAWINGS

Some of the objects and advantages of this invention having been stated, other objects and advantages will appear as the description proceeds, when taken in conjunction with the accompanying drawings, in which:

FIG. 1 is a schematic block diagram illustrating the steps of the process of this invention; and FIGS. 2–7 are schematic, partial perspective views illustrating various steps utilized in the process of this invention.

DESCRIPTION OF PREFERRED EMBODIMENT

Referring now to the drawings, a metal roll 10 is covered by the process of this invention. These metal rolls 10 are conventionally of elongate, generally cylindrical shape having stub shafts 11 extending longitudinally from the ends thereof for supporting the rolls in the processing machinery in which they are utilized in the textile, paper or other industries. In covering of these rolls 10 with a rubber-like coating or covering, the outside circumference along the length of the rolls 10 is covered with a sheet rubber-like material 13, preferably by applying a suitable cement around the longitudinal circumference of the roll 10 and applying the sheet rubber-like material therearound, as shown in FIG. 2. The sheet rubber-like material 13 is preferably dimensioned so as to have approximately a one-half inch overhang over each of the ends 10a of the rolls 10. The overhangs serve to define an enclosed area at the exposed ends of the roll where the semi-liquid material is to be applied.

The sheet rubber-like material, as utilized for covering the outside circumferences of the roll 10, is obtainable from commercial sources and involves all polymers in use today for roll covering compounds. The composition of a sheet rubber-like material suitable for covering the outside circumference of the rolls 10 could be similar to the following specific example, which may vary according to desired characteristics:

|  | Parts By Weight |
|---|---|
| Solid natural or synthetic gum rubber | 100.0 |
| Zinc oxide | 5.0 |
| Stearic acid | 2.0 |
| Carbon black | 70.0 |
| Plasticizing oil (such as dioctyl phthylate) | 15.0 |
| Antioxidant (such as phenyl betanatphyl amine) | 2.0 |
| Sulfur | 5.0 |
| Accelerator (such as tetramethyl thiuram disulfide) | 1.5 |

Next, the ends 10a of the roll 10 are coated with a suitable solvent based cement or adhesive 15, which may also be utilized on the circumference of the roll 10. This cement or adhesive 15 may be a commercially available adhesive based on a solvent dissolved mixture of soluble co-curable polymers, phenolic resins, or isocyanates, such as "Chemlok 205" or "Ti-Ply BN", commercially available from Hughson Chemical Company, Division of Lord Corporation.

After applying cement 15 to the ends 10a of the roll 10, a semi-liquid, elastomeric, polymeric coating composition 20 is extruded in a continuous stream by any suitable device normally used to handle very high viscosity liquids. As illustrated in the drawings, this device may include a manually operated, gun-type extruder device 21 which received the semi-liquid coating composition 20 through a conduit 22 having a pump 23 therein and which is connected with a suitable supply source. The semi-liquid coating composition 20 is extruded through the gun or extruder 21 in a continuous ribbon or stream, preferably about ⅜ inch to ½ inch in width, in an increasing diameter spiral, as shown in FIG. 3, onto the cemented end 10a of the roll 10 around the stub shaft 11 extending outwardly therefrom until the entire surface of the end 10a of the roll 10 is covered by a stream of the semi-liquid coating composition. The extruder or gun device 21 and pump 23, shown schematically in FIG. 3, are merely exemplary of a suitable extruding device and many such devices may be utilized. Even a simple caulking gun would be suitable for small rolls. Additionally, the semi-liquid coating composition could be applied by the use of scoops or trowels.

The semi-liquid elastomeric, polymeric, coating composition 20 must have a viscosity sufficient to prevent sagging from the ends of the metal rolls when applied thereto while being sufficiently liquid to dispense easily in a continuous stream. For this purpose, it is preferable for the semi-liquid coating composition 20 to have a molecular weight of about 2,000 to 20,000 and a viscosity sufficiently high from about 60mm to 180mm of penetration (ASTM D217, Cone Potentiometer Test), to prevent sagging from the ends 10a of the roll 10 during subsequent cross-linking or curing, to be described below, yet have a viscosity sufficiently low of from about 75mm to 110mm of penetration to allow formation thereof easily into a continuous stream. As stated above, the preferable viscosity range is from about 60mm to 110mm.

Also, a viscosifier, such as fumed silica, may be incorporated in the semi-liquid coating composition 20 to contribute a thixotropic character to the composition. This allows a lowering of the viscosity during mechanical agitation by the pumping to easily form a continuous stream of the composition and a rising in viscosity after mechanical agitation and when the composition has been applied to the ends 10a of the metal roll 10 to prevent flow or sagging during the cross-linking or curing operation.

By this invention, a semi-liquid, elastomeric, polymeric, coating composition having such characteristics has been formulated and in its broadest aspects, as set forth above, comprises:

|  | Parts By Weight Range |
| --- | --- |
| Cross-linkable liquid elastomeric polymer | 100.0 |
| Porosity suppressant | 1.5 – 3.5 |
| Accelerator | 0.1 – 5.0 |
| Non-reinforcing pigment filler | 50.0 – 90.0 |
| Reinforcing mineral pigment | 55.0 – 75.0 |
| Cross-linking agent | 2.0 – 35.0 |
| Viscosifier | 0 – 10.0 |

A specific example of a commercially practical, semi-liquid, elastomeric, polymeric, coating composition is, as follows:

|  | Parts By Weight |
| --- | --- |
| Styrene-butadiene liquid rubber | 100.0 |
| Lime | 2.5 |
| Tetra Methyl thiuram disulphide | 1.0 |
| Titanium dioxide | 62.5 |
| Hard Clay | 65.0 |
| Sulfur | 25.0 |

The cross-linkable liquid polymer, while set forth in the specific commercially practical example given above may be styrene-butadiene liquid rubber, commercially available from American Synthetic Rubber Corporation of Louisville, Kentucky and sold as "Flosbrene 25VLV", other cross-linkable liquid elastomeric polymers may be used including liquid polyisoprene, polybutadiene, acrylonitrile-butadiene co-polymer, liquid natural rubber, or even polyester resins.

The porosity suppressant may be any finely ground lime or anhydrous calcium oxide. The accelerator is utilized for speeding up the cure or cross-linking of the composition during heating thereof and preferably may be tetra methyl thiuram disulphide or similar chemical. The non-reinforcing pigment, preferably in the form of titanium dioxide, is utilized as a filler in the composition and the mineral pigment, preferably in the form of hard clay, is utilized as a reinforcement in the composition. The cross-linking agent operates during the cross-linking step for hardening of the polymer and may be in the form of sulfur. The viscosifier is utilized as needed and fumed silica is preferred.

Next, in the process of this invention, the semi-liquid coating composition 20, which has been applied to the end 10a of the roll 10 is smoothed by hand by the operator, preferably with a suitable alcohol on the hands to prevent sticking of the composition to the hands, as shown in FIG. 4, to completely cover the ends 10a of the roll 10 and to provide a smooth even coating thereon. The extending ends of the covering 13 cooperate for this purpose.

Following this smoothing step, the other end of the roll 10 may be covered in a similar manner and the entire roll face may be wrapped with tape 25 as indicated in FIG. 5.

After taping, one or a plurality of thus processed or covered rolls 10 are placed in a suitable vulcanizing or curing mechanism 30 for heating the roll 10 and the coverings 13, 20 thereon to cure and cross-link the coverings, in a manner well understood by those with ordinary skill in the art, to form a hard, rubber-like covering. The roll end coverings 20 formed by the process described above is cross-linked along with the sheet rubber-like stock covering 13 on the rolls longitudinal circumferential surface to provide a permanent seal and bond therebetween.

The tape 25 is then removed and the roll 10 may be finished by well known techniques including machining on a lathe 35, as shown in FIG. 7.

The process of this invention and the specifically formulated semi-liquid, elastomeric, polymeric, coating composition allows the covering of the ends of metal rolls utilized in manufacturing or processing operation in various industries, in an economical and efficient manner not heretofore suggested and provides an improved end coated or covered metal roll. There is provided for the first time by this invention a semi-liquid, elastomeric, polymeric, coating composition which may be utilized in this process.

In the drawings and specification, there has been set forth a preferred embodiment of this invention and, although specific terms are employed, they are used in a generic and descriptive sense only and not for purposes of limitation.

What is claimed is:

1. A process of forming a hard, rubber-like covering on the circumferential and end surfaces of a cylindrical metal roll of the type utilized in the textile, paper or other industry, said method comprising the steps of:
   applying a solid, cross-linkable elastomeric sheet material around the circumference of the cylindrical roll to form a covering therearound, said covering having a length greater than the length of the roll to provide an overhang at each end of the roll surrounding and enclosing the exposed end surfaces of the roll;
   applying a semi-liquid elastomeric, polymeric coating composition to the end surfaces of the roll in the area surrounded and enclosed by the overhang at each end of the roll, said coating composition having a viscosity sufficient to prevent sagging from the ends of the roll prior to curing and being cross-linkable to form a hard, rubber-like material;
   smoothing the semi-liquid coating on the ends of the roll to form an even, uninterrupted covering thereon;
   and heating the roll to cure and cross-link the solid covering material around the circumference of the roll and the semi-liquid coating at the ends of the roll and to form a permanent seal and bond therebetween.

2. A cylindrical metal roll having a covering of a hard, rubber-like material on the circumferential and end surfaces thereof and formed according to the process of claim 1.

3. A process, as set forth in claim 1, in which said step of applying the semi-liquid coating composition onto the end surfaces of the metal roll comprises forming a continuous stream of the semi-liquid coating composition, and applying such stream to the end surfaces of the metal roll.

4. A process, as set forth in claim 3, in which said step of applying the stream of semi-liquid coating composition comprises extruding the stream onto the end surfaces of the metal roll in an increasing diameter, continuous spiral for covering the entire area of such ends.

5. A process, as set forth in claim 1, in which the semi-liquid elastomeric, polymeric, coating composition has a molecular weight in the range of about 2,000 to 20,000.

6. A process, as set forth in claim 1, in which the semi-liquid elastomeric, polymeric, coating composition has a viscosity in the range of about 60mm to 110mm of penetration (ASTM D217, Cone Potentiometer Test).

7. A process, as set forth in claim 1, in which said step of applying the semi-liquid coating composition onto the end surfaces of the metal rolls includes pumping the semi-liquid coating composition and forming a continuous stream thereof for applying onto the end surfaces of the metal roll, and in which the semi-liquid coating composition has thixotropic characteristics for providing a rise in viscosity of the composition after agitation during said pumping to additionally prevent sagging from the ends of the metal rolls when applied thereto.

8. A process, as set forth in claim 1, in which the semi-liquid elastomeric, polymeric, coating composition comprises:

|  | Parts By Weight Range |
|---|---|
| Cross-linkable liquid elastomeric polymer | 100.0 |
| Porosity suppressant | 1.5 - 3.5 |
| Accelerator | 0.1 - 5.0 |
| Non-reinforcing pigment filler | 50.0 - 90.0 |
| Reinforcing mineral pigment | 55.0 - 75.0 |
| Cross-linking agent | 2.0 - 35.0 |
| Viscosifier | 0 - 10.0 |

9. A process, as set forth in claim 8, in which the cross-linkable liquid elastomeric polymer is selected from the group consisting of styrene-butadiene liquid rubber, liquid polyisoprene, polybutadiene, acrylonitrile-butadiene co-polymer, liquid natural rubber, and polyester resins.

10. A process, as set forth in claim 1, in which said step of smoothing the semi-liquid coating composition on the ends of the metal roll comprises manual smoothing by an operator at a force less than 200 to 10,000 pounds per square inch required to form conventional rubber compositions utilized for covering metal rolls.

* * * * *